US012658743B2

(12) United States Patent (10) Patent No.: US 12,658,743 B2
Lee et al. (45) Date of Patent: Jun. 16, 2026

(54) STATOR

(71) Applicant: HYUNDAI MOBIS CO., LTD., Seoul
(KR)

(72) Inventors: Jae Hak Lee, Suwon-si (KR); **Jeong
Ki Kwon, Yongin-si (KR); Hyoung
Geun Park, Yongin-si (KR); Yong Ho
Kim**, Seoul (KR)

(73) Assignee: Hyundai Mobis Co., Ltd., Seoul (KR)

( * ) Notice: Subject to any disclaimer, the term of this
patent is extended or adjusted under 35
U.S.C. 154(b) by 177 days.

(21) Appl. No.: 18/581,625

(22) Filed: Feb. 20, 2024

(65) Prior Publication Data

US 2024/0396384 A1 Nov. 28, 2024

(30) Foreign Application Priority Data

May 24, 2023 (KR) ........................ 10-2023-0066896

(51) Int. Cl.
H02K 1/16 (2006.01)
(52) U.S. Cl.
CPC .............. H02K 1/165 (2013.01); H02K 1/16
(2013.01); *H02K 2213/03* (2013.01)
(58) Field of Classification Search
CPC ...... H02K 1/165; H02K 1/16; H02K 2213/03;
H02K 2201/03; H02K 1/00; H02K 1/06;
H02K 1/08; H02K 1/12; H02K 1/14
USPC ..................................... 310/216.091, 216.064
See application file for complete search history.

(56) References Cited

U.S. PATENT DOCUMENTS

| | | | |
|---|---|---|---|
| 10,622,860 B2 | 4/2020 | Park et al. | |
| 10,784,748 B2 | 9/2020 | Inoue | |
| 2012/0007465 A1 | 1/2012 | Fargo et al. | |
| 2015/0139830 A1* | 5/2015 | Nigo ...................... | H02K 1/146 |
| | | | 310/216.097 |
| 2017/0346353 A1 | 11/2017 | Kitao et al. | |
| 2019/0181714 A1* | 6/2019 | Park ........................ | H02K 11/02 |

FOREIGN PATENT DOCUMENTS

| | | | | |
|---|---|---|---|---|
| JP | 2002-335642 A | | 11/2002 | |
| JP | 2003070189 A | * | 3/2003 | |
| JP | 5777869 B2 | | 9/2015 | |
| KR | 20000032089 A | * | 6/2000 | ............... H02K 1/16 |
| KR | 10-2022-0136837 A | | 10/2022 | |

OTHER PUBLICATIONS

Kim Wan Su, Rotation-Resistance Reduction Assembly for Rotor of
Motor, Jun. 5, 2000, KR 20000032089 (English Machine Transla-
tion) (Year: 2000).*
Ishio Yusuke, Synchronous Motor, Mar. 7, 2003, JP 2003070189
(English Machine Translation) (Year: 2003).*
Extended European search report issued on Sep. 3, 2024, in coun-
terpart European Patent Application No. 24160576.5 (10 pages).

* cited by examiner

*Primary Examiner* — Alexander A Singh
(74) *Attorney, Agent, or Firm* — NSIP Law

(57) ABSTRACT
Provided is a stator applied to a motor. The stator of the
present disclosure may reduce a production cost and simul-
taneously minimize a motor failure occurring due to corro-
sion by using an inexpensive steel ball bearing, which is
enabled by reducing a magnitude of an shaft voltage that
causes the corrosion rather than using a structure (for
example, a ceramic bearing or an SGR bearing) for avoiding
the corrosion.

10 Claims, 7 Drawing Sheets

FIG. 5

STATOR

CROSS-REFERENCE TO RELATED APPLICATIONS

This application claims priority under 35 U.S.C. § 119 to Korean Patent Application No. 10-2023-0066896, filed on May 24, 2023, in the Korean Intellectual Property Office, the disclosure of which is incorporated herein by reference in its entirety.

BACKGROUND

1. Field

The following disclosure relates to a stator, and more particularly, to a stator applied to a motor.

2. Description of Related Art

A prior interior permanent magnet (IPM)-type motor has a permanent magnet embedded in a rotor, and may be driven by pulse width modulation (PWM) control of an inverter delivering power to a coil assembly. A common mode voltage may be applied to parasitic capacitance of the motor by the PWM control, thus generating an shaft voltage between the shaft axis and bearing of the motor. When the shaft voltage is generated between the shaft axis of the motor and the bearing, and a bearing ball and an inner/outer ring come into contact with each other in a case where the motor is running, an axis current may flow through the bearing due to the shaft voltage, which may cause bearing corrosion. The bearing corrosion may cause a bearing noise and excessive vibration, which may cause motor failure in the long term.

In addition, as specifications required for the motor are gradually increased, a voltage of the power applied to the motor may be increased, and a carrier frequency used by the inverter may tend to be increased. As a result, the shaft voltage and the axis current, which are main causes of the bearing corrosion, may also be increased, resulting in an increase in the frequency of failures caused by the bearing corrosion.

In order to solve this problem, the prior art may use a ceramic bearing or a shaft grounding ring (SGR) bearing. However, in this case, a material cost may be increased. In addition, even when an SGR processing is used to prevent the corrosion, its effect may be insignificant due to increased brush resistance caused by abrasion of carbon brushes and oil cooling.

SUMMARY

An embodiment of the present disclosure is directed to providing a stator which may reduce a production cost and simultaneously minimize a motor failure occurring due to corrosion by using an inexpensive steel ball bearing, which is enabled by reducing a magnitude of an shaft voltage that causes the corrosion rather than using a structure (for example, a ceramic bearing or an SGR bearing) for avoiding the corrosion.

In one general aspect, a stator, either surrounding the outside of a rotor or positioned inside the rotor and accommodating a coil assembly, includes: two first walls arranged radially around an axis of rotation and parallel to the axis of rotation, wherein the two first walls are respectively in contact with one surface and another surface of the coil assembly; and two second walls formed between the coil assembly and the rotor in a circumferential direction, and respectively extending from the two first walls, wherein the two second walls form an open slot by being spaced apart from each other by a distance around the coil assembly, wherein the two second walls respectively include slot surfaces where the two second walls form the open slot, and wherein the slot surfaces face each other, and shaft voltage reduction means positioned on the respective slot surfaces.

The shaft voltage reduction means may each include a first blocking part formed on the corresponding slot surface of the second wall and having one surface having a predetermined inclination angle relative to an extension direction of the second wall.

The extension direction of the second wall may be parallel to the axis of rotation.

The two first blocking parts may have respective surfaces facing each other, one surface of one of the two first blocking parts is inclined by a predetermined inclination angle 'a' relative to the extension direction of the second wall, one surface of the other of the two first blocking parts is inclined by a predetermined inclination angle 'b' relative to the extension direction of the second wall, and the inclination angles 'a' and 'b' satisfy the following expression:

$$\begin{cases} \arctan\left(\dfrac{h}{tw}\right) \le a < 90° \\ 90 \le b < 180° \end{cases}$$

where 'h' is a thickness of the second wall and tw is an extension length of the second wall.

Each shaft voltage reduction means may include a second blocking part formed on the slot surface of the second wall, an inclination area, which is a portion of one surface of the second blocking part, has a predetermined inclination angle relative to an extension direction of the second wall, and another portion of the one surface of the second blocking part is perpendicular to the extension direction of the second wall.

The two second blocking parts applied to one coil assembly may have respective surfaces facing each other, the inclination area of the one surface is inclined by a predetermined inclination angle 'c' relative to the extension direction of the second wall, the inclination area of one surface of the other of the two second blocking parts is inclined by a predetermined inclination angle 'd' based on the extension direction of the second wall, and the inclination angles 'c' and 'd' satisfy the following expression:

$$\begin{cases} \arctan\left(\dfrac{h}{tw}\right) \le c < 90° \\ 90 \le d < 180° \end{cases},$$

where 'h' is a thickness of the inclination area and 'tw' is an extension length of the second wall.

Each shaft voltage reduction means may include a third blocking part formed on the corresponding slot surface of the second wall, a first region, which is a portion of one surface of the third blocking part, is inclined to one side relative to an extension direction of the second wall to have a predetermined inclination angle, and a second region, which is another portion of the one surface of the third blocking part, is inclined to the other side relative to the extension direction of the second wall to have a predetermined inclination angle.

The two third blocking parts applied to one coil assembly may have respective surfaces facing each other, the first region of the one surface of the one of third blocking parts is inclined by a predetermined inclination angle 'e' relative to the extension direction of the second wall, and the corresponding second region is inclined by a predetermined inclination angle e' relative to the extension direction of the second wall, the first region of the one surface of the other of the third blocking parts is inclined by a predetermined inclination angle 'f' relative to the extension direction of the second wall, and the corresponding second region is inclined by a predetermined inclination angle f' relative to the extension direction of the second wall, and the inclination angles 'e', 'e', 'f', and 'f' satisfy the following expression:

$$\begin{cases} \arctan\left(\dfrac{h}{tw}\right) \le e < 90°, \; e' \le 90° \\ 90 \le f, \; f' < 180° \end{cases}$$

where 'h' is a thickness of the first region and 'tw' is an extension length of the second wall).

Each of the shaft voltage reduction means may include a fourth blocking part formed on the slot surface of the second wall, one of the fourth blocking parts, which face each other, extends from the slot surface with a convex curvature, and the other of the fourth blocking parts is recessed in the slot surface with a concave curvature.

The shaft voltage reduction means may include a fifth blocking part formed on the slot surface of the second wall, and each of the fifth blocking parts facing each other includes one protrusion part protruding in a direction in which the fifth blocking parts face each other and a groove part concave in an opposite direction thereof.

The protrusion part and the groove part may be formed for the respective facing surfaces of the fifth blocking parts to correspond to each other.

In another general aspect, a stator includes: first and second walls arranged around an axis of rotation and having extension directions parallel to an axis of rotation of a core, wherein the first wall is in contact with a first surface of a coil assembly and the second wall is in contact with a second surface of the coil assembly; and a third wall and a fourth wall formed between the coil assembly and the rotor in a circumferential direction, where the third wall extends from the first wall and the fourth wall extends from the second wall, wherein the third wall and the fourth wall are spaced apart from each other by a distance around the coil assembly to form an open slot, and where the third and fourth walls from the open slot they include respective slot surfaces, and wherein the slot surfaces have at least a portion thereof that are not parallel to the axis of rotation.

One of the slot surfaces may have at least a portion thereof that forms an oblique angle with respect to the axis of rotation.

One of the slot surfaces may have at least a portion thereof that forms an acute angle with respect to the axis of rotation.

One of the slot surfaces may have a convex shape or a concave shape.

The portion that is not parallel to the axis of rotation may include a protrusion that is perpendicular to the axis of rotation.

The portion that is not parallel to the axis of rotation may include a notch or groove.

BRIEF DESCRIPTION OF THE DRAWINGS

FIG. 5 is a plan view showing a fourth embodiment of an shaft voltage reduction means of the present disclosure.

DETAILED DESCRIPTION

Figure 1:
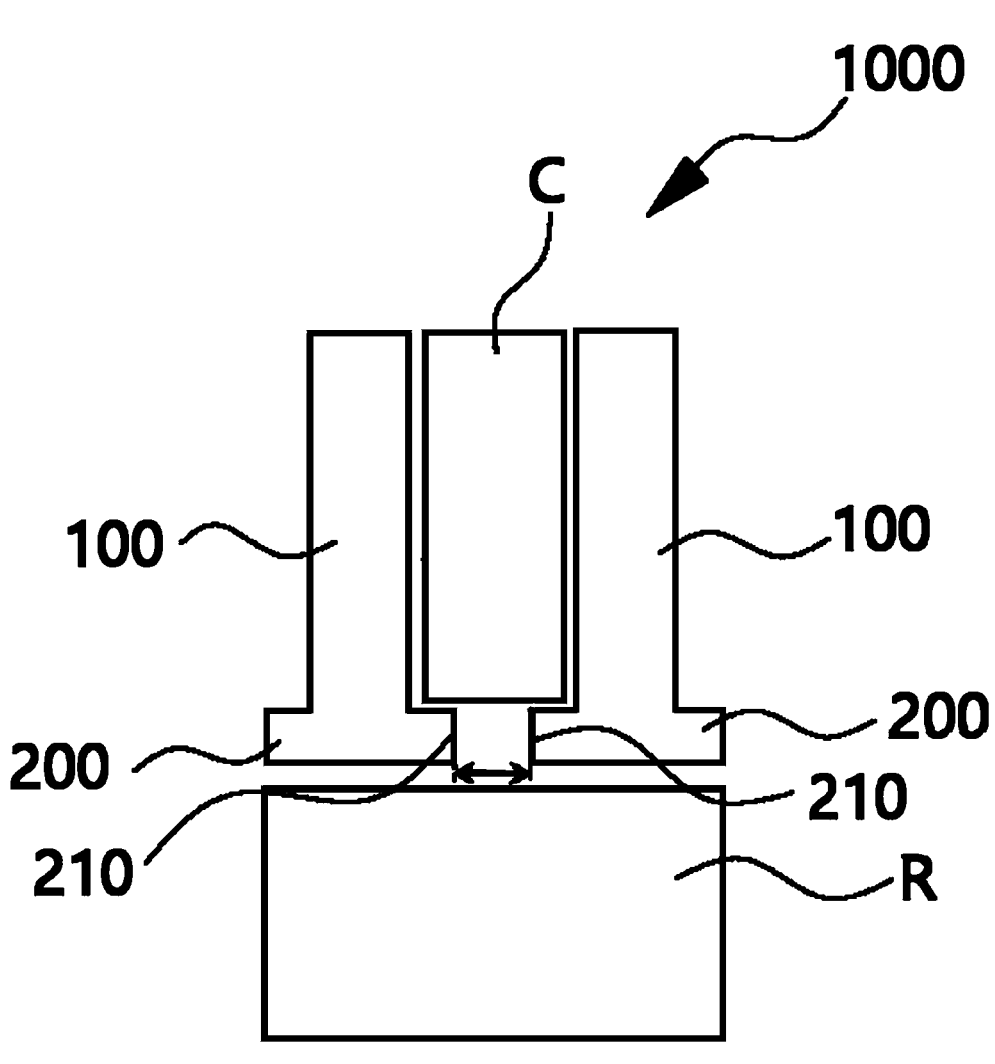
FIG. 1 is a schematic diagram showing a basic form of a stator of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, the description describes a basic configuration of a stator 1000 of the present disclosure with reference to FIG. 1.

As shown in FIG. 1, the present disclosure relates to the stator 1000 surrounding the outside of a rotor R or positioned inside the rotor R and accommodating a coil assembly C. Here, the coil assembly C refers to a coil assembly including a plurality of coils. The stator 1000 of the present disclosure may include a first wall 100 and a second wall 200. The first walls 100 may be formed radially from a rotation axis of a motor, and respectively be in contact with one surface and the other surface of the coil assembly C. Two first walls 100 may be provided, and the first walls 100 may face each other while being parallel to each other. However, in a case of a round wire motor, the respective first walls 100 may be parallel to each other to increase coil usage.

In addition, the stator 1000 of the present disclosure may include the second wall 200 extending from the first wall 100. The second walls 200 may be formed between the coil assembly C and the rotor R in a circumferential direction, and respectively extend from the two first walls 100. Here, the two first walls 100 may face each other while being parallel to each other. That is, a position of the coil assembly C may be supported by each of the second walls 200. The two second walls 200 may form an open slot by being spaced apart from each other by a predetermined distance around the coil assembly C. An electric field of the coil assembly C may be transmitted to a core of the rotor R through the open slot.

The stator 1000 of the present disclosure may include the shaft voltage reduction means reducing an effective open area of the open slot and positioned on a slot surface 210 which is a surface where the two second walls 200 forming the open slot face each other. The shaft voltage reduction means may be integrally formed with the second wall 200, and minimize the shape and effective open area of the open slot. It is thus possible to reduce capacitance of the electric field transmitted through the open slot, and an shaft voltage to prevent bearing corrosion. The shaft voltage may largely depend on a common mode voltage applied to the coil assembly C and a capacitance between the coil and the rotor R, thus more efficiently reducing the shaft voltage by the shaft voltage reduction means of the present disclosure.

Hereinafter, the description describes a first embodiment of the shaft voltage reduction means of the present disclosure in more detail with reference to FIG. 2.

Figure 2:
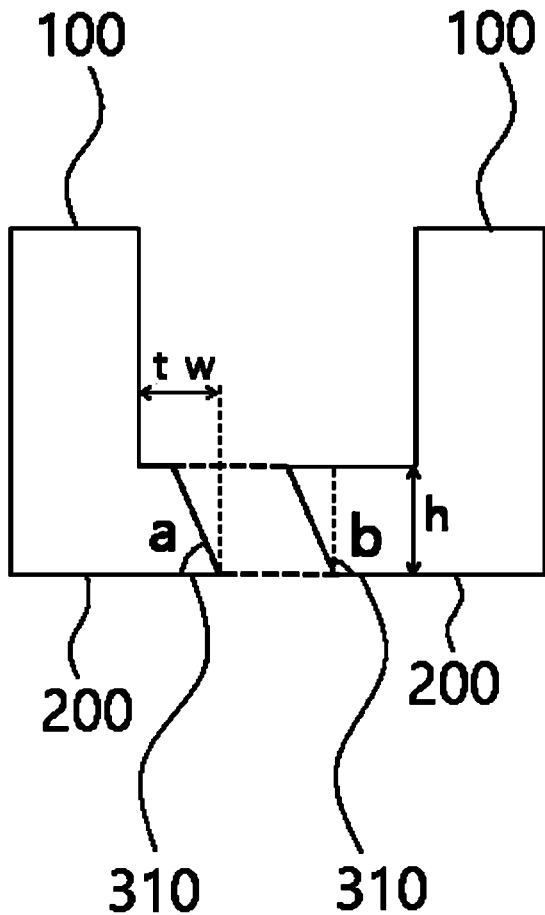
FIG. 2 is a plan view showing a first embodiment of an shaft voltage reduction means of the present disclosure.

As shown in FIG. 2, the shaft voltage reduction means in a first embodiment may include a first blocking part 310 formed on the slot surface 210 of the second wall 200 and having one surface having a predetermined inclination angle with an extension direction of the second wall 200. In detail, the two first blocking parts 310 applied to one coil assembly C may have respective surfaces facing each other. The first blocking part 310 may have a certain shape and be formed on the second wall 200. The first blocking part 310 may protrude from the second wall 200, or may be etched from the second wall 200.

One surface of one of the two first blocking parts 310 may have an inclined surface by being inclined by a predetermined inclination angle 'a' based on the extension direction of the second wall 200; and one surface of the other of the two first blocking parts 310 may have an inclined surface by being inclined by a predetermined inclination angle 'b' based on the extension direction of the second wall 200. Here, the inclination angles 'a' and 'b' may satisfy the following expression:

$$\begin{cases} \arctan\left(\dfrac{h}{tw}\right) \le a < 90° \\ 90 \le b < 180° \end{cases} \qquad \text{[Expression 1]}$$

(Here, 'h' indicates a thickness of the second wall 200, and tw indicates an extension length of the second wall 200).

However, here, the length of tw that is changed by the inclination angle 'a' needs to be greater than or equal to zero. In addition, the respective surfaces of the two first blocking parts 310 may not be in contact or interfere with each other. Each of the inclined surfaces of the first blocking part 310 formed by the inclination angles 'a' and 'b' does not overlap the first wall 100. Here, the inclination angles 'a' and 'b' may have a phase difference of 90 degrees from each other, and the respective surfaces of the two first blocking parts 310 that face each other may be parallel to each other, thus adding convenience in their processing.

The effective open area of the open slot may be reduced by the inclination angles 'a' and 'b' by forming the first blocking part 310 in this way. More clearly, a result of analyzing this effect is shown in a table below.

TABLE 1

| | Design factor affecting shaft voltage | | | Open slot | Analysis result of shaft voltage | |
| | Outer diameter [mm] of rotor R | Distance [mm] between stator and rotor | Distance [mm] between coil and rotor | effective open area [mm] before and after application of patent shape | Shaft voltage [V] before and after application of patent shape | Reduction rate |
|---|---|---|---|---|---|---|
| 1 | 66.20 | 0.60 | 2.02 | 2.00→0.82 | 7.21→4.84 | −49.1% |
| 2 | 65.60 | 1.20 | 2.62 | 2.50→1.32 | 14.02→10.17 | −49.1% |
| 3 | 66.20 | 0.60 | 2.02 | 1.50→0.32 | 4.97→3.77 | −32.0% |
| 4 | 65.40 | 1.40 | 2.82 | 1.50→0.32 | 8.67→7.44 | −16.6% |

Models 1 to 4 in Table 1 are experimental groups selected by changing some designs to suit a use case based on an existing SG2 motor. The first blocking part 310 is applied to the stator 1000 of each of the models 1 to 4. As analyzed in Table 1, the first blocking part 310 is applied to the stator 1000 of every model, and it is thus confirmed that the effective open area of the open slot is greatly reduced, which directly relates to a reduction rate of the shaft voltage that is reduced from a minimum of 16.6% to a maximum of 49.1%.

In addition, performed is a comparison of charge changes occurring on a surface of the rotor R with and without the shaft voltage reduction means applied to the stator 1000. As a result, it is confirmed that a charge remains on the surface of the rotor R when the shaft voltage reduction means is not applied to the stator 1000 of the present disclosure. On the other hand, it is confirmed that the charge on the surface of the rotor R is reduced when a first embodiment of the shaft voltage reduction means is applied to the stator 1000 of the present disclosure.

Further, an average torque of the motor is 422.06 Nm when a first embodiment of the shaft voltage reduction means is not applied to the stator 1000 of the present disclosure, and the measured average torque of the motor is 422.25 Nm, which is almost the same as before its application, when a first embodiment of the shaft voltage reduction means is applied to the stator 1000 of the present disclosure. According to this measurement result, it may be confirmed that the motor does not have lower performance even when the shaft voltage reduction means of the present disclosure is applied to the stator 1000.

Hereinafter, the description describes a second embodiment of the shaft voltage reduction means of the present disclosure in more detail with reference to FIG. 3.

Figure 3:
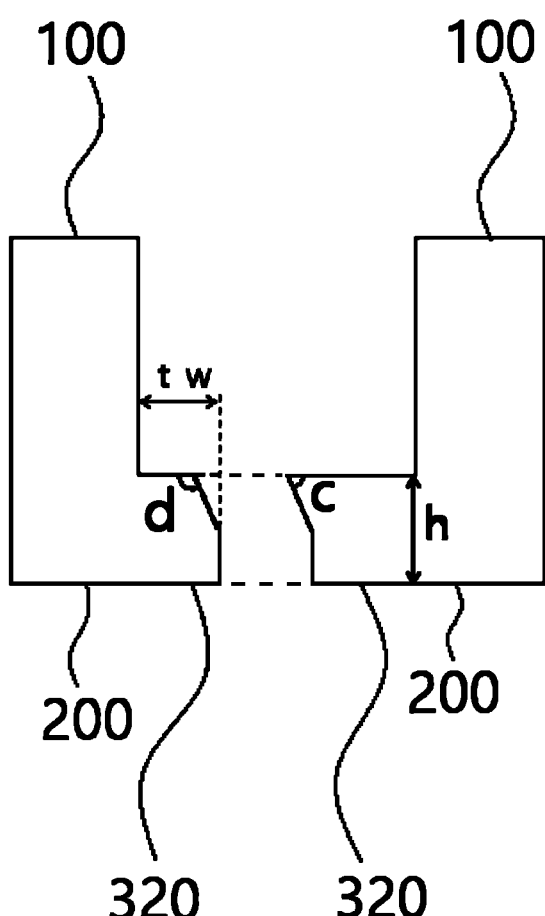
FIG. 3 is a plan view showing a second embodiment of an shaft voltage reduction means of the present disclosure.

As shown in FIG. 3, the shaft voltage reduction means may include a second blocking part 320 formed on the slot surface 210 of the second wall 200. An inclination area which is at least a portion of one surface of the second blocking part 320 may have a predetermined inclination angle with the extension direction of the second wall 200, and the other portion of one surface of the second blocking part 320 may be perpendicular to the extension direction of the second wall 200. Here, the portion having the inclination angle may be close to the coil assembly C.

In detail, the two second blocking parts 320 applied to one coil assembly C may have respective surfaces facing each other. The second blocking part 320 may have a certain shape and be formed on the second wall 200. The second blocking part 320 may protrude from the second wall 200, or may be etched from the second wall 200.

In addition, one surface of one of the two second blocking parts 320 may have an inclined surface by being inclined by a predetermined inclination angle 'c' based on the extension direction of the second wall 200; and one surface of the other of the two second blocking parts 320 may have an inclined surface by being inclined by a predetermined inclination angle 'd' based on the extension direction of the second wall 200. Here, the inclination angles 'c' and 'd' may satisfy the following expression:

$$\begin{cases} \arctan\left(\dfrac{h}{tw}\right) \le c < 90° \\ 90 \le d < 180° \end{cases} \qquad \text{[Expression 2]}$$

(Here, 'h' indicates a thickness of the inclination area, and tw indicates an extension length of the second wall 200).

However, here, the length of tw that is changed by the inclination angle 'c' needs to be greater than or equal to zero. In addition, the respective surfaces of the two second blocking parts 320 may not be in contact or interfere with each other. Each of the inclined surfaces of the second blocking part 320 formed by the inclination angles 'c' and 'd' does not overlap the first wall 100. Here, the inclination angles 'c' and 'd' may have a phase difference of 90 degrees from each other, and the respective surfaces of the two second blocking parts 320 that face each other may be parallel to each other, thus adding convenience in their processing. The effective open area of the open slot may be reduced by the inclination angles 'c' and 'd' by forming the second blocking part 320 in this way.

In addition, the stator may secure increased stability when using a second embodiment of the shaft voltage reduction means where a portion of the slot surface 210 is perpendicular to the extension direction of the second wall 200 to thus reduced wear of a front end of the second wall 200.

Hereinafter, the description describes a third embodiment of the shaft voltage reduction means of the present disclosure in more detail with reference to FIG. 4.

Figure 4:
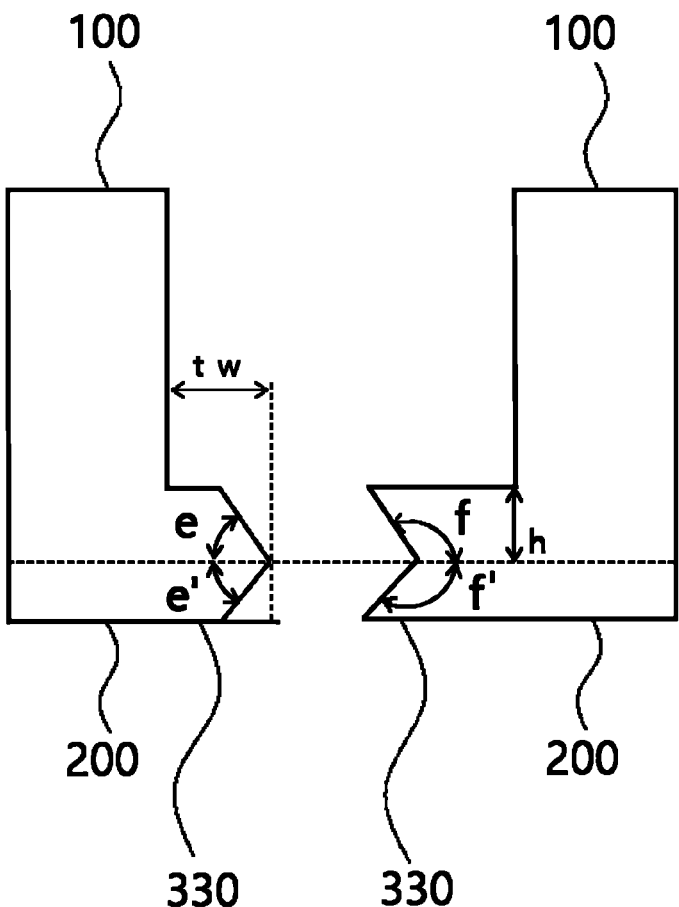
FIG. 4 is a plan view showing a third embodiment of an shaft voltage reduction means of the present disclosure.

As shown in FIG. 4, the shaft voltage reduction means may include a third blocking part 330 formed on the slot surface 210 of the second wall 200. A first region which is at least a portion of one surface of the third blocking part 330 may be inclined to one side from the extension direction of the second wall 200 to have a predetermined inclination angle, and a second region which is the other portion of one surface of the third blocking part 330 may be inclined to the other side from the extension direction of the second wall 200 to have a predetermined inclination angle. Here, the two third blocking parts 330 applied to one coil assembly C may have respective surfaces facing each other. The third blocking part 330 may have a certain shape and be formed on the second wall 200. The third blocking part 330 may protrude from the second wall 200, or may be etched from the second wall 200.

In addition, the first region of one surface of one of the two third blocking parts 330 may have an inclined surface by being inclined by a predetermined inclination angle 'e' based on the extension direction of the second wall 200, and its second region may have an inclined surface by being inclined by a predetermined inclination angle e' based on the extension direction of the second wall 200; the first region of one surface of the other of the two third blocking parts 330 may have an inclined surface by being inclined by a predetermined inclination angle 'f' based on the extension direction of the second wall 200, and its second region may have an inclined surface by being inclined by a predetermined inclination angle f' based on the extension direction of the second wall 200, respectively. The inclination angles 'e', e', 'f', and f may satisfy the following expression:

$$\begin{cases} \arctan\left(\dfrac{h}{tw}\right) \le e < 90°, e' \le 90° & \text{[Expression 3]} \\ 90 \le f, f' < 180° \end{cases}$$

(Here, 'h' indicates a thickness of the first region, and tw indicates an extension length of the second wall 200).

In addition, the respective surfaces of the two third blocking parts 330 may not be in contact or interfere with each other. Each of the inclined surfaces of the third blocking part 330 formed by the inclination angles 'e', e', 'f', and f' does not overlap the first wall 100. Here, the inclination angles 'e' and 'f' or e' and f may have a phase difference of 90 degrees from each other, and the respective surfaces of the two third blocking parts 330 that face each other may be parallel to each other, thus adding convenience in their processing. The effective open area of the open slot may be reduced by the inclination angles 'e', e', 'f', and f' by forming the third blocking part 330 in this way.

In addition, the stator may secure even more maximized stability when using a third embodiment of the shaft voltage reduction means where an opening direction of the open slot is prevented from being biased in a specific direction and simultaneously, the effective open area of open slots may be limited.

Hereinafter, the description describes a fourth embodiment of the shaft voltage reduction means of the present disclosure in more detail with reference to FIG. 5.

Figure 5:
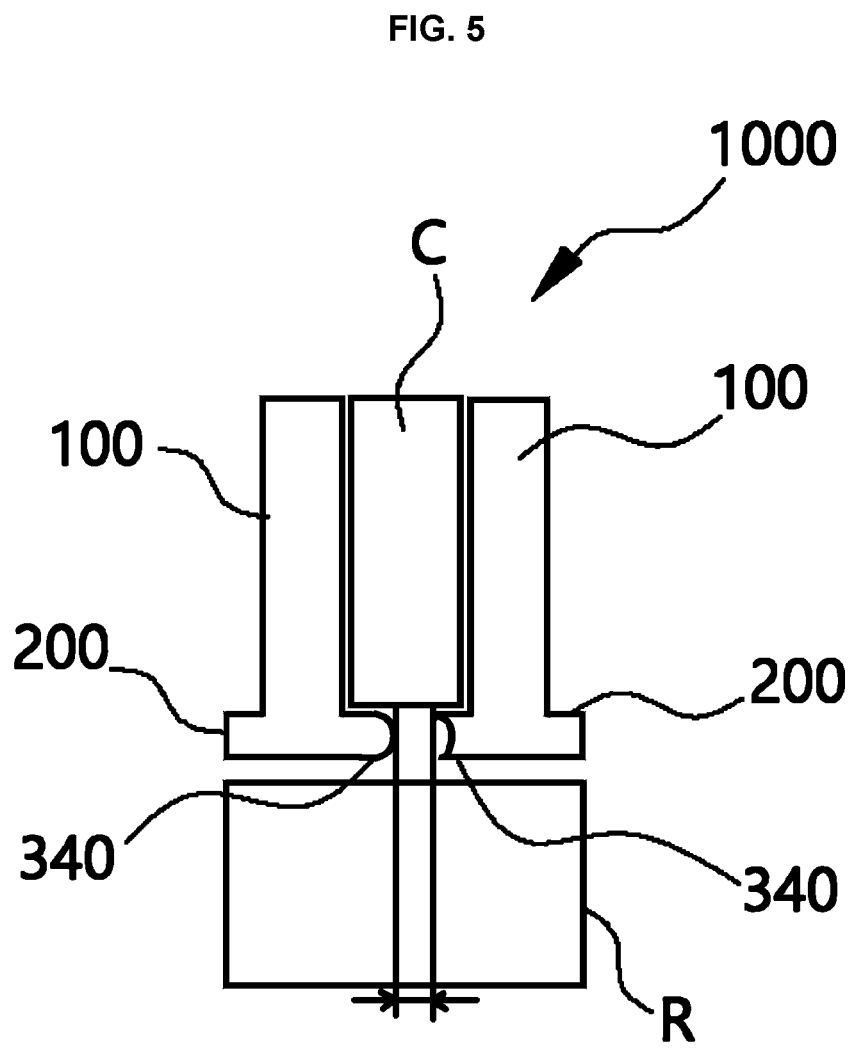

As shown in FIG. 5, the shaft voltage reduction means may include a fourth blocking part 340 formed on the slot surface 210 of the second wall 200. One of the fourth blocking parts 340 facing each other may extend from the slot surface 210 while having a convex shape with a predetermined curvature, and the other of the fourth blocking parts 340 facing each other may be etched from the slot surface 210 to have a concave shape with a predetermined curvature. Here, the fourth blocking parts 340 facing each other may have the same curvature. That is, the fourth blocking parts 340 may have shapes corresponding to each other. The stator may secure increased stability when using a fourth embodiment of the shaft voltage reduction means where wear of the slot surface 210 of the open slot through which the electric field passes may be minimized.

Hereinafter, the description describes a fifth embodiment of the shaft voltage reduction means of the present disclosure in more detail with reference to FIGS. 6 and 7.

Figure 6:
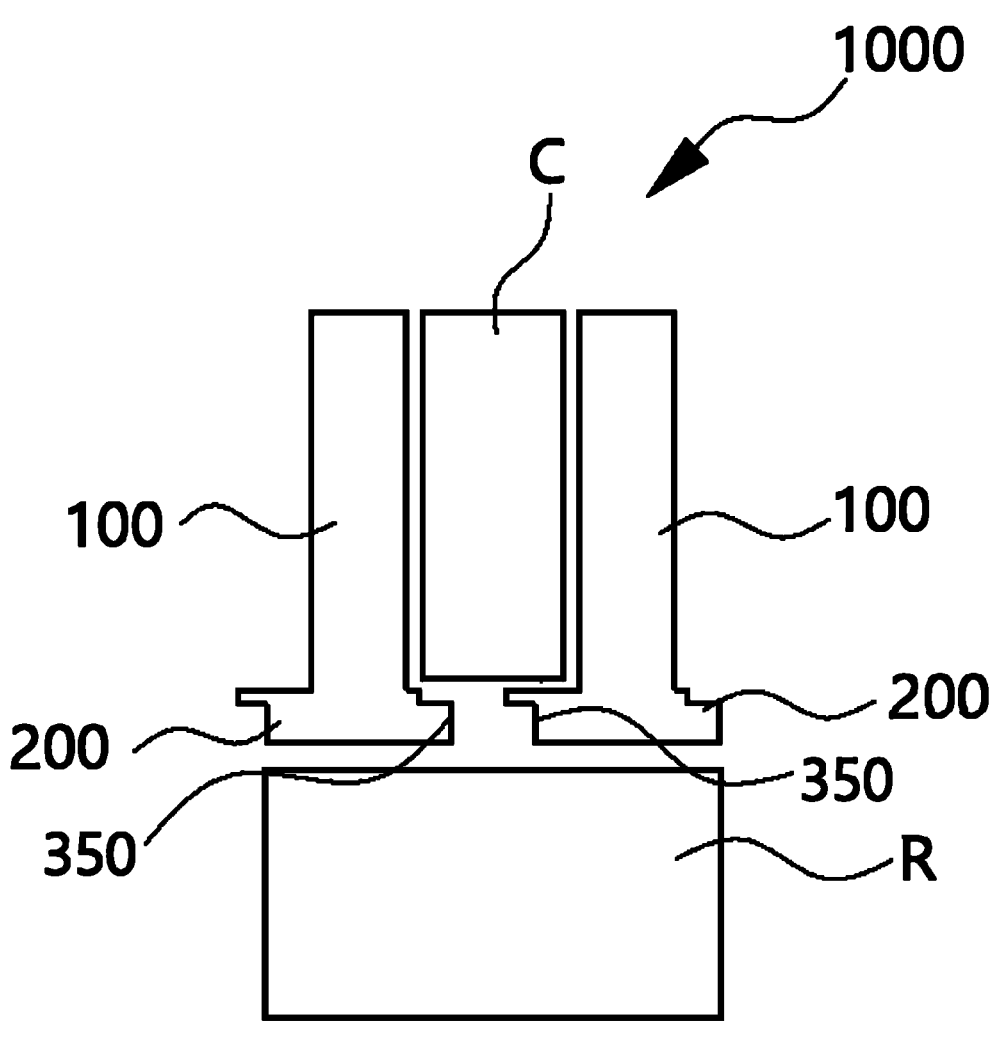
FIGS. 6 and 7 are plan views showing a fifth embodiment of an shaft voltage reducing means of the present disclosure.
Figure 7:
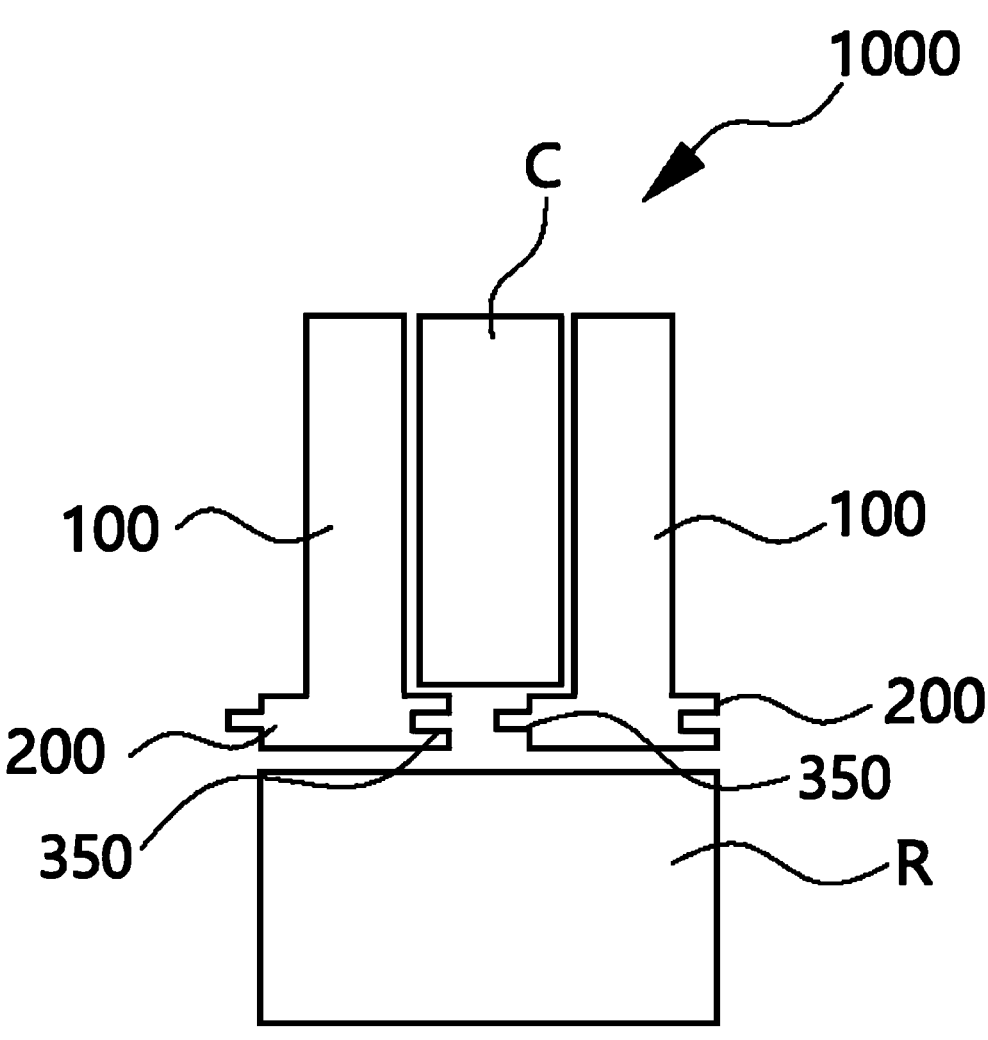

As shown in FIGS. 6 and 7, the shaft voltage reduction means may include a fifth blocking part 350 formed on the slot surface 210 of the second wall 200. Each of the fifth blocking parts 350 facing each other may include at least one of at least one protrusion part protruding in a direction in which the fifth blocking parts 350 face each other and a groove part concave in an opposite direction thereof. Here, the protrusion part and the groove part may be formed for the respective facing surfaces of the fifth blocking parts 350 to correspond to each other.

In detail, as shown in FIG. 6, the fifth blocking part 350 may have a groove and a protrusion, formed at its end in contact with the coil assembly C, or as shown in FIG. 7, the fifth blocking part 350 may have a protrusion or a groove, formed at the center of one surface. In this way, the stator may have increased interference when using a fifth embodiment of the shaft voltage reduction means of the present disclosure where the open slot which is a transmission path of the electric field may be more complexly formed.

As set forth above, the stator of the present disclosure configured as above may reduce the production cost and simultaneously minimize the motor failure occurring due to the corrosion by using the inexpensive steel ball bearing, which is enabled by reducing the magnitude of the shaft voltage that causes the corrosion rather than using the structure (for example, the ceramic bearing or the SGR bearing) for avoiding the corrosion.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A stator either surrounding the outside of a rotor or positioned inside the rotor and accommodating a coil assembly, the stator comprising:

two first walls arranged radially around an axis of rotation and parallel to the axis of rotation, wherein the two first walls are respectively in contact with one surface and another surface of the coil assembly; and two second walls formed between the coil assembly and the rotor in a circumferential direction, and respectively extending from the two first walls, wherein the two second walls form an open slot by being spaced apart from each other by a distance around the coil assembly, wherein the two second walls respectively comprise slot surfaces where the two second walls form the open slot, and wherein the slot surfaces face each other, and one or more shaft voltage reducers positioned on the respective slot surfaces, and wherein each of the shaft voltage reducers includes:

a third blocking part formed on the corresponding slot surface of the second wall;

a first region, which is a portion of one surface of the third blocking part, is inclined to one side relative to an extension direction of the second wall to have a predetermined inclination angle; and a second region, which is another portion of the one surface of the third blocking part, is inclined to the other side relative to the extension direction of the second wall to have a predetermined inclination angle.

2. The stator of claim 1, wherein each of the shaft voltage reducers includes a first blocking part formed on the corresponding slot surface of the second wall and having one surface having a predetermined inclination angle relative to an extension direction of the second wall.

3. The stator of claim 2, wherein the extension direction of the second wall is parallel to the axis of rotation.

4. The stator of claim 2, wherein the two first blocking parts have respective surfaces facing each other, wherein one surface of one of the two first blocking parts is inclined by a predetermined inclination angle 'a' relative to the extension direction of the second wall, wherein one surface of the other of the two first blocking parts is inclined by a predetermined inclination angle 'b' relative to the extension direction of the second wall, and wherein the inclination angles 'a' and 'b' satisfy the following expression:

$$\begin{cases} \arctan\left(\dfrac{h}{tw}\right) \le a < 90° \\ 90 \le b < 180° \end{cases}$$

where 'h' is a thickness of the second wall and tw is an extension length of the second wall.

5. The stator of claim 1, wherein each of the shaft voltage reducers includes a second blocking part formed on the slot surface of the second wall, wherein an inclination area, which is a portion of one surface of the second blocking part, has a predetermined inclination angle relative to an extension direction of the second wall, and wherein another portion of the one surface of the second blocking part is perpendicular to the extension direction of the second wall.

6. The stator of claim 5, wherein the two second blocking parts applied to one coil assembly have respective surfaces facing each other, wherein the inclination area of the one surface is inclined by a predetermined inclination angle 'c' relative to the extension direction of the second wall, wherein the inclination area of one surface of the other of the two second blocking parts is inclined by a predetermined inclination angle 'd' based on the extension direction of the second wall, and wherein the inclination angles 'c' and 'd' satisfy the following expression:

$$\begin{cases} \arctan\left(\dfrac{h}{tw}\right) \le c < 90° \\ 90 \le d < 180° \end{cases}$$

where 'h' is a thickness of the inclination area and 'tw' is an extension length of the second wall.

7. The stator of claim 1, wherein the two third blocking parts applied to one coil assembly have respective surfaces facing each other, wherein the first region of the one surface of the one of third blocking parts is inclined by a predetermined inclination angle 'e' relative to the extension direction of the second wall, and the corresponding second region is inclined by a predetermined inclination angle e' relative to the extension direction of the second wall, wherein the first region of the one surface of the other of the third blocking parts is inclined by a predetermined inclination angle 'f' relative to the extension direction of the second wall, and the corresponding second region is inclined by a predetermined inclination angle f' relative to the extension direction of the second wall, and wherein the inclination angles 'e', 'e'', 'f', and 'f'' satisfy the following expression:

$$\begin{cases} \arctan\left(\dfrac{h}{tw}\right) \le e < 90°, e' \le 90° \\ 90 \le f, f' < 180° \end{cases}$$

where 'h' is a thickness of the first region and where 'tw' is an extension length of the second wall.

8. The stator of claim 1, wherein each of the shaft voltage reducers includes a fourth blocking part formed on the slot surface of the second wall, wherein one of the fourth blocking parts, which face each other, extends from the slot surface with a convex curvature, and wherein the other of the fourth blocking parts is recessed in the slot surface with a concave curvature.

9. The stator of claim 1, wherein each of the shaft voltage reducers includes a fifth blocking part formed on the slot surface of the second wall, and wherein each of the fifth blocking parts facing each other includes one protrusion part protruding in a direction in which the fifth blocking parts face each other and a groove part concave in an opposite direction thereof.

10. The stator of claim 9, wherein the protrusion part and the groove part are formed for the respective facing surfaces of the fifth blocking parts to correspond to each other.

* * * * *